Figure 1:
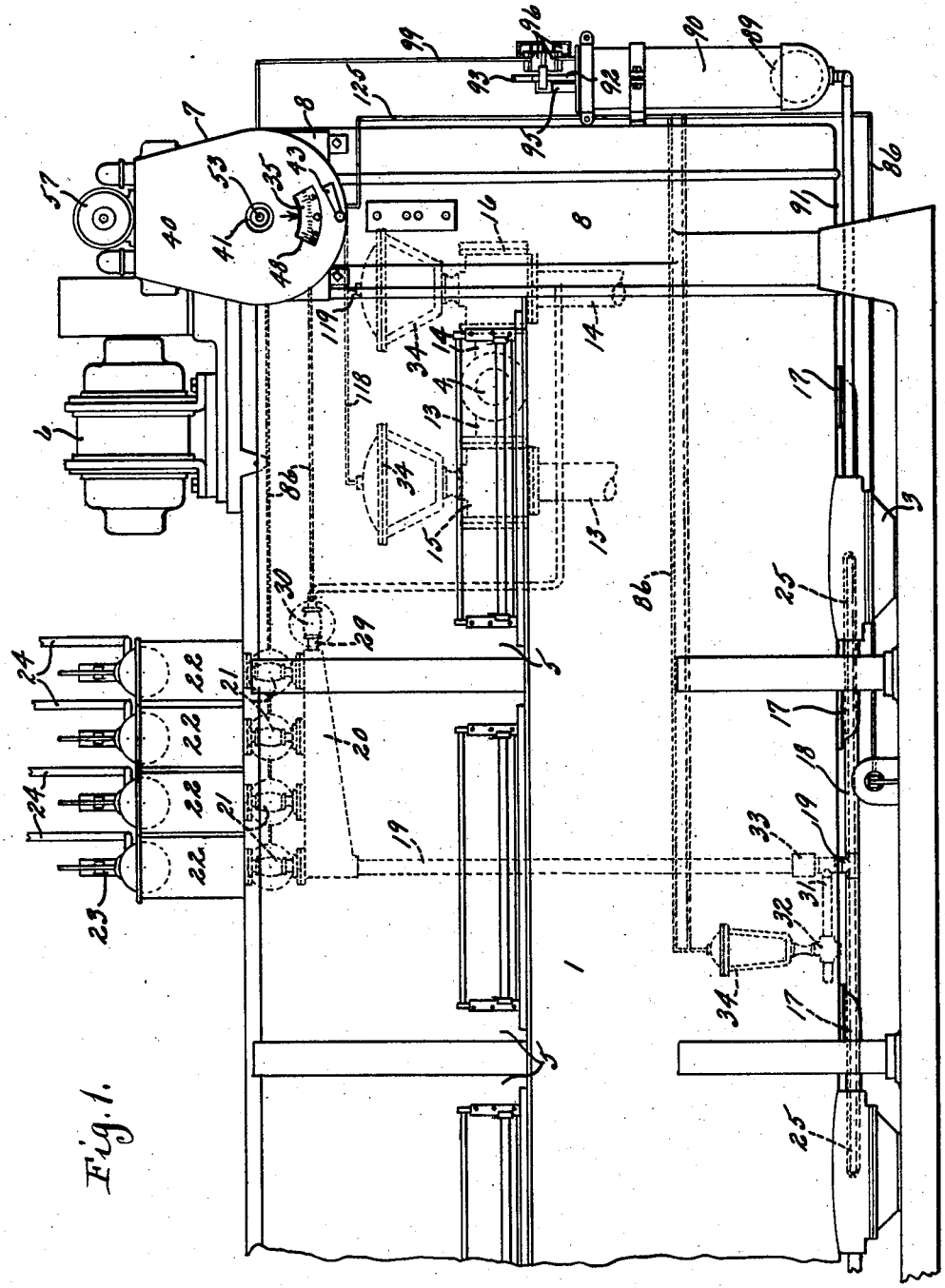

Dec. 15, 1936.  F. BALZER ET AL  2,064,053
AUTOMATIC FORMULA CONTROL FOR WASHING MACHINES
Filed July 7, 1931  6 Sheets-Sheet 1

INVENTORS
Fred Balzer & Gilbert B. Knapmeyer
BY
Brockett, Hyde, Higley & Meyer
ATTORNEYS Dec. 15, 1936.   F. BALZER ET AL   2,064,053
AUTOMATIC FORMULA CONTROL FOR WASHING MACHINES
Filed July 7, 1931   6 Sheets-Sheet 3

INVENTORS
Fred Balzer & Gilbert B. Knapmeyer
BY
Brockett, Hyde, Higley & Meyer
ATTORNEYS Dec. 15, 1936.  F. BALZER ET AL  2,064,053
AUTOMATIC FORMULA CONTROL FOR WASHING MACHINES
Filed July 7, 1931  6 Sheets-Sheet 4
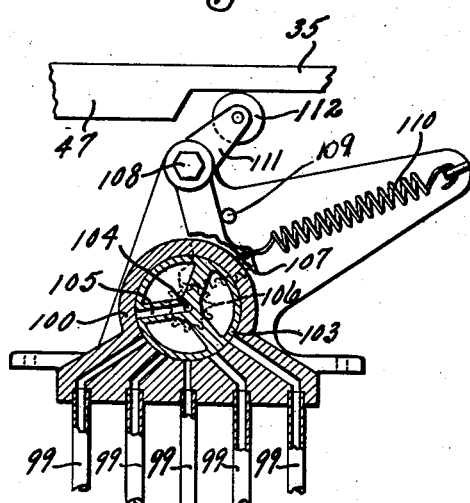
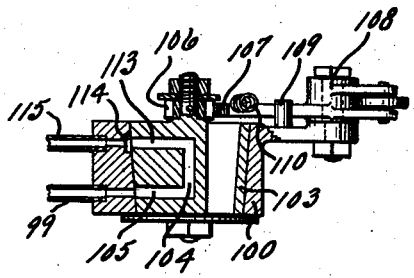
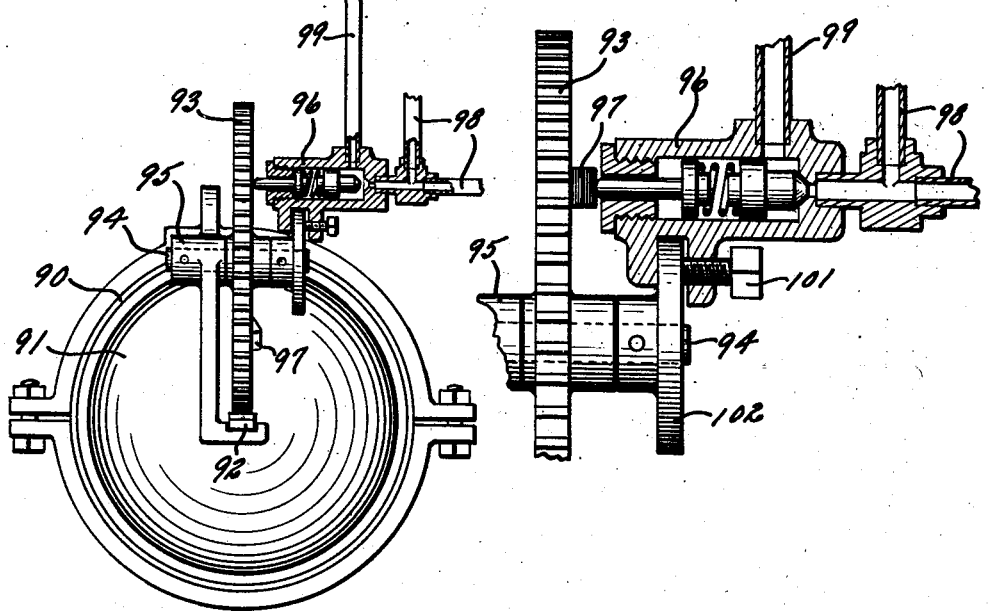
INVENTORS
Fred Balzer & Gilbert B. Knapmeyer
BY
Brockett, Hyde, Higley & Meyer
ATTORNEYS

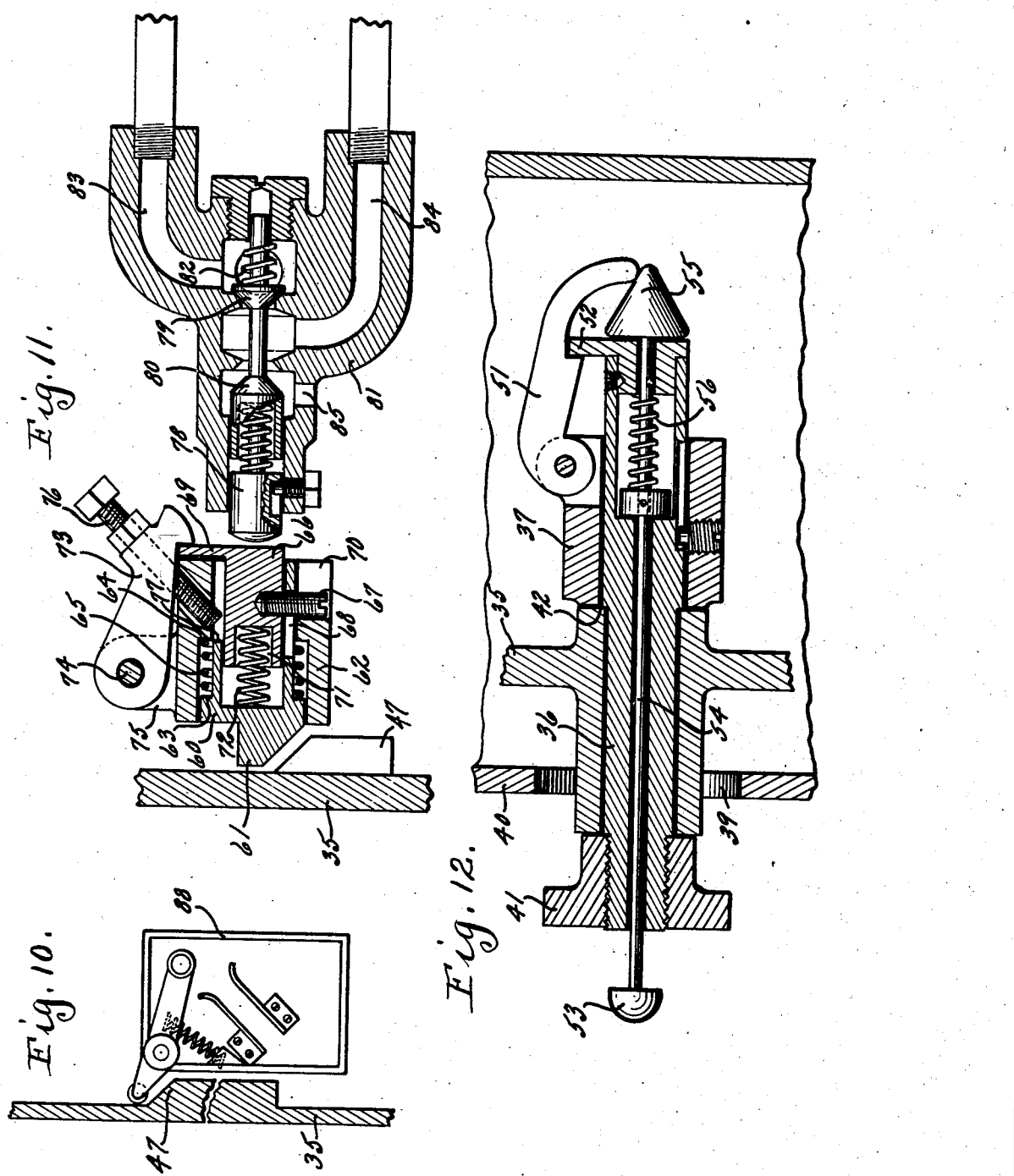

Patented Dec. 15, 1936

2,064,053

UNITED STATES PATENT OFFICE 2,064,053

AUTOMATIC FORMULA CONTROL FOR WASHING MACHINES

Fred Balzer, Cincinnati, Ohio, and Gilbert B. Knapmeyer, Covington, Ky., assignors to The American Laundry Machinery Company, Cincinnati, Ohio, a corporation of Ohio Application July 7, 1931, Serial No. 549,218

5 Claims. (Cl. 68—18)

Our invention relates to formula control mechanism and, particularly, to an automatic formula control for washing machines as used in power laundries.

Heretofore, several washing machines in each power laundry have been constructed to operate with and carry out certain formulas, the control for these formulas being in most cases by manual attention or manipulation, and the formula for each machine was ordinarily placed on a chart attached to or located near the machine where it could be observed by the operator. It has been customary for one operator to watch the several operations of the formula in a number of washing machines and manually operate the different valves and levers to perform the different steps of the washing operation. With this arrangement it has been demonstrated that one operator could only supervise the proper operation of not more than four machines.

One object of our invention is to provide an automatic formula control mechanism by the use of which the operator has only to start the washing machine in operation whereupon the several operations or steps necessary to include the use of the entire formula are automatically regulated by the control mechanism and when the end of the formula is reached the machine is automatically stopped and a signal given to so advise the operator. Thus, the operator has only to unload and reload and then start each machine at the conclusion of a formula whereby it is possible for a single operator to control as many as ten to fifteen different machines and the formula in each machine will be run much more accurately than is ordinarily done when the human element enters into the supervision.

Other objects of our invention are to provide an automatic formula control for washing machines of such nature that it is possible to automatically work any desired formula or cycle of operations; to provide a control mechanism that is applicable to any existing washer and of such nature that the formula or cycle of operations may be changed at will; to provide a control means such that the machine can be stopped at any point during the carrying out of the formula and can be again operated at any point either at the stopping point or later or earlier than that point; to construct the controlling mechanism so compact that it can be attached to any washing machine without requiring additional floor space; and to provide indicating means whereby the operator may be informed as to the step of the formula in which the machine is operating.

Figure 2:
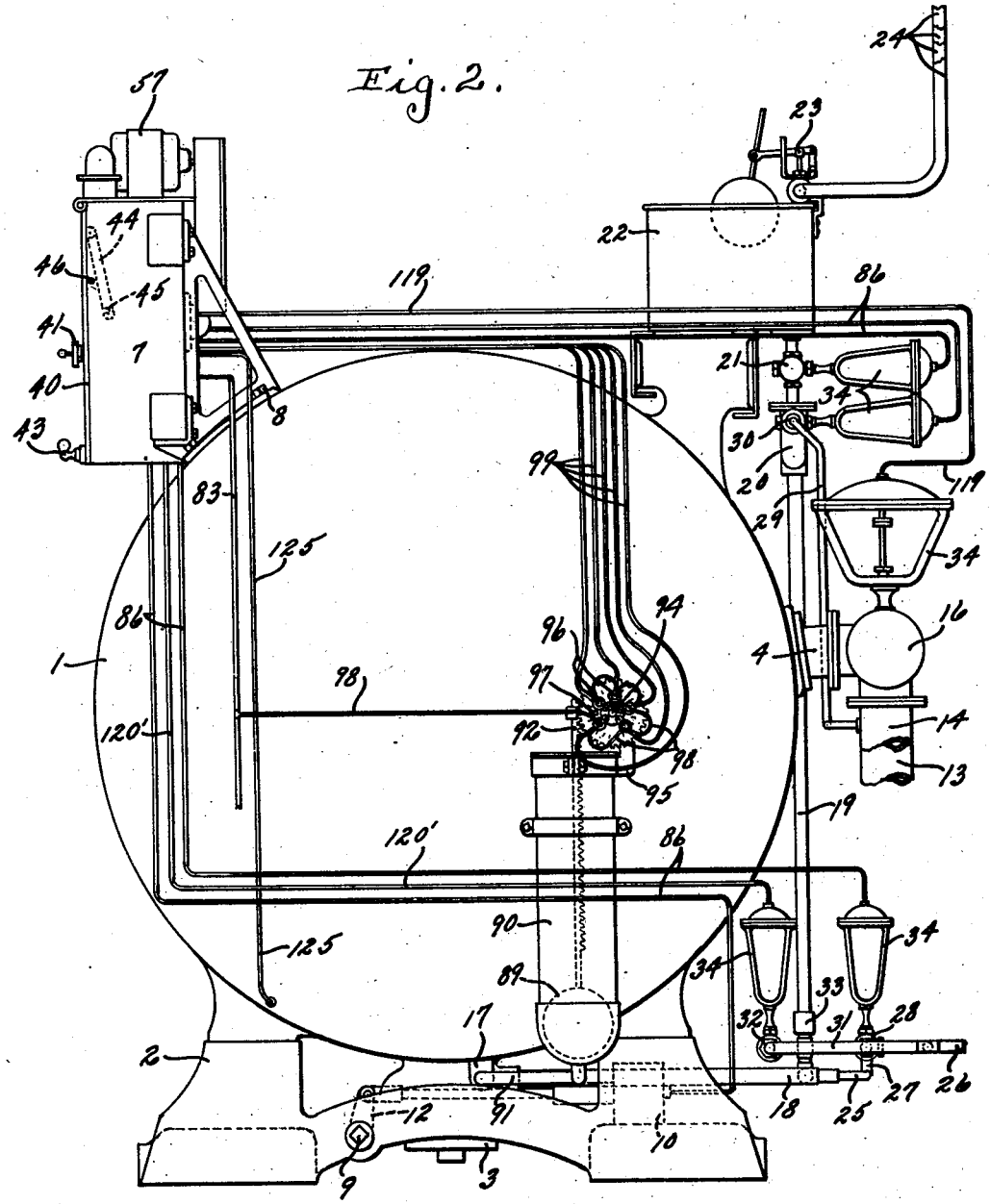
Figure 3:
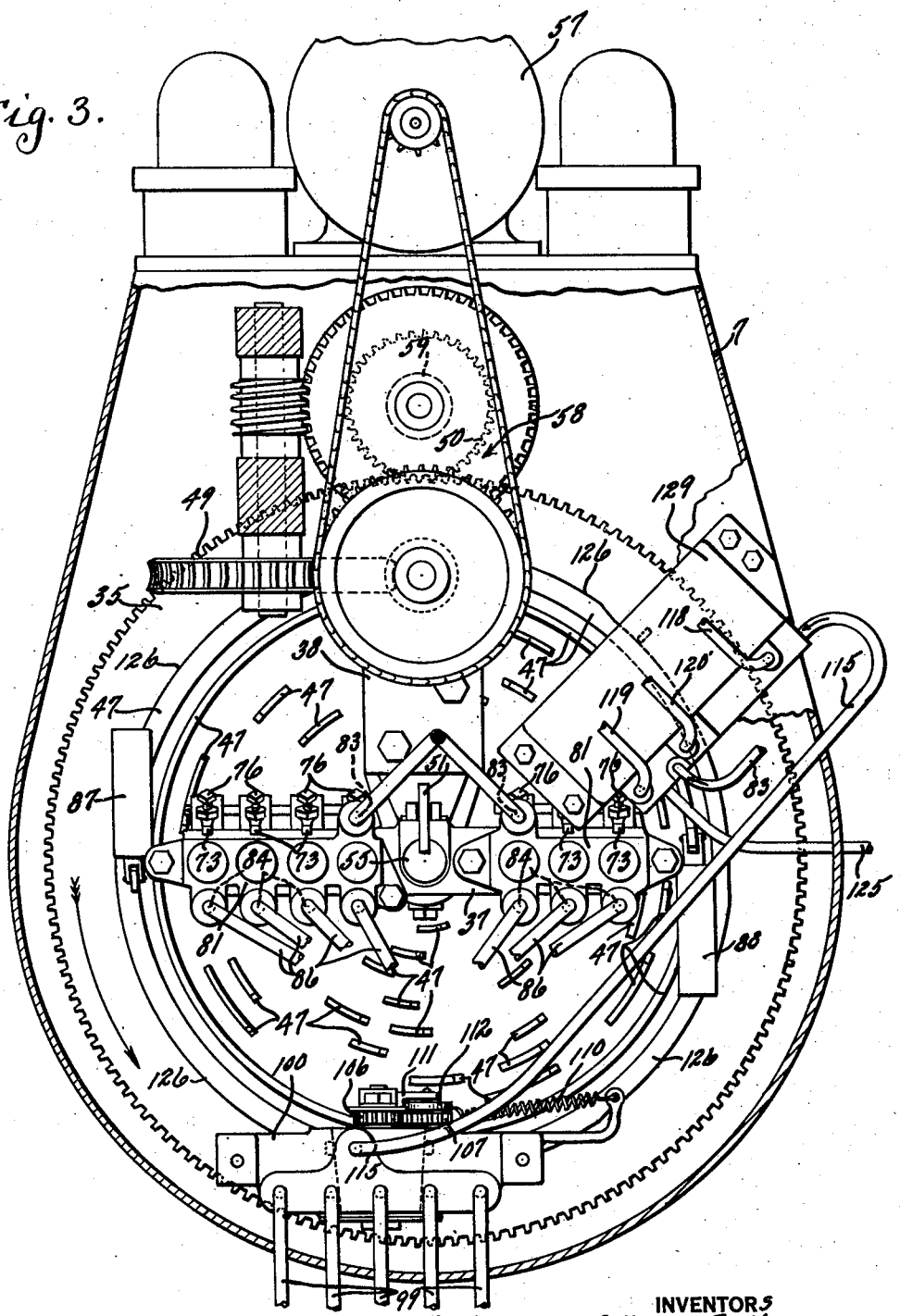
Figure 7:
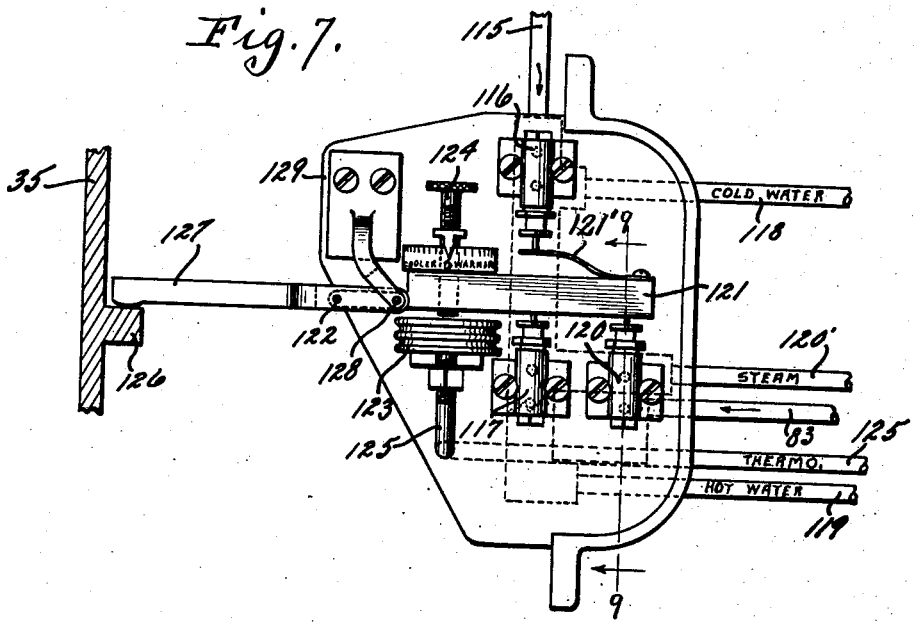
Figure 8:
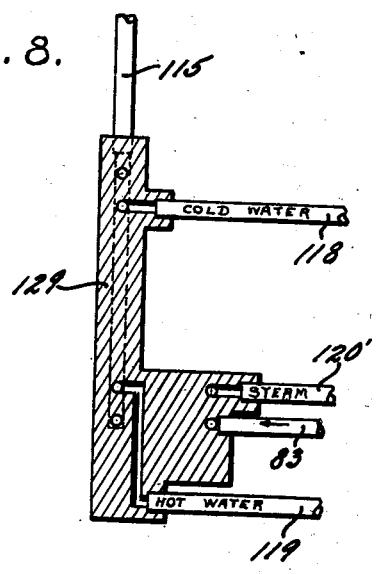
Figure 9:
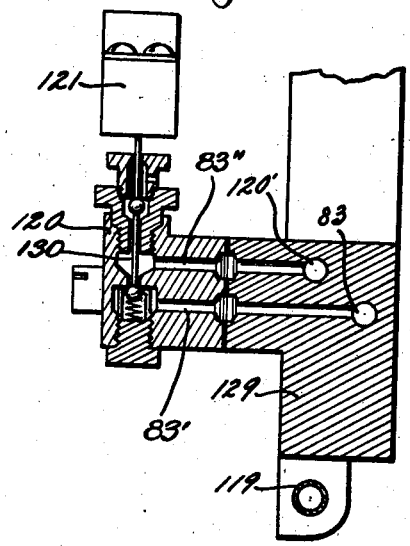

Various other objects and advantageous features will be seen in the following description and one embodiment thereof may be seen in the accompanying drawings wherein similar characters of reference designate corresponding parts, and wherein:

Fig. 1 is a front view of a washing machine equipped with an automatic formula control constructed in accordance with our invention; Fig. 2 is a view of the right hand end of the machine shown in Fig. 1; Fig. 3 is a view of the rearward side of the control box of the automatically operating cycle or formula control mechanism with part of the housing broken away to expose the interior mechanism; Figs. 4, 5 and 6 are detail views of the apparatus for controlling the water level in the washer tub; Figs. 7, 8 and 9 are views of the mechanism for controlling the temperature of the water in the tub; Fig. 10 is a view showing one of the electric switches for controlling the operation of the washer tub that is associated with the automatic formula control mechanism; Fig. 11 is a view showing the operating means for the air valves embodied in the apparatus; and Fig. 12 is a fragmentary sectional view of the control disk that forms a part of the control mechanism and its housing, partly illustrating how the control disk is mounted.

Referring to the drawings and particularly Figs. 1 and 2 thereof wherein only the right hand end of the washing machine tub is shown, we have shown one embodiment of our invention as comprising a washing machine tub 1 mounted upon a frame 2 and provided with dump valves 3, a water inlet 4, and having the usual doors 5 and driving motor 6. A control box 7 for the operation of the formula or cycle is mounted, as shown in Fig. 2, at a convenient location on the tub guard 8 and at the right hand end of the apparatus. However, the control box may be located at any suitable place either on or off the machine.

The dump valves 3 are of the self-closing gravity type and are moved to open position by rotating a non-circular rock shaft 9 a part of a complete revolution counter-clockwise as viewed in Fig. 2. Rotation of the rock shaft 9 to open the dump valves 3 is accomplished by a fluid pressure cylinder 10 whose piston rod is flexibly connected to the free end of an arm 12 secured on the rock shaft 9. The piston in the cylinder 10 is returned to its normal unoperated position by a suitable weight or spring after air pressure is released therefrom, air pressure to operate the piston being admitted to the cylinder upon operation of a suitable valve.

As shown in Fig. 1, the water inlet 4 is provided with two branch pipes 13 and 14, the pipe 13 furnishing a constant pressure of cold water to the inlet 4 and under control of a valve 15 and the pipe 14 furnishing a constant pressure of hot water to the inlet 4 and under control of a valve 16.

A plurality of injectors 17 are provided at the bottom of the tub for injecting washing solutions into the tub and have connected thereto large conduits 18 which are branches of a main supply pipe 19 leading down from the lower side of a manifold or header 20 that is located preferably near the top of the machine and connected by short pipes provided with valves 21 to serve washing solution containers 22. Each container 22 is provided with a float controlled valve 23 mounted on the lower end of a supply pipe 24 which leads from the main supply tank, not shown, to the containers. The main supply pipe is preferably located at a higher level than the containers 22 whereby washing solutions are automatically retained at a predetermined level in the containers 22.

A small steam pipe 25 enters each conduit 18 at a point adjacent each injector 17 in such manner as to form a syphon to force the washing solutions entering the injectors through the supply pipe 19 and conduits 18 into the tub 1, the steam pipes 25 connecting with a main steam pipe 26 by means of a pipe 27 which is provided with a valve 28 as shown in Fig. 2. Each time any one of the several washing solutions from the containers is fed into the tub 1, the valve 28 is set in open position whereby steam will be utilized to force this solution into the tub. As shown in Fig. 1, the header 20 has its bottom on an incline with the outlet pipe 19 connected at the lowermost point and a flushing pipe 29 connected to a source of hot water and provided with a valve 30 connected to its opposite end. After each solution from the containers 22 has been fed into the tub 1 through the header 20, the valve 30 is opened whereby the header and supply pipe are rinsed out and cleansed by hot water.

A steam pipe 31 is connected to the lower end of the supply pipe 19 near the point at which the branch conduits 18 are connected thereto to force steam through the conduits 25 and into the tub 1 for boiling purposes. Such pipe 31 is provided with a valve 32 to control the flow of steam from a source of supply and the supply pipe 19 is provided with a check valve 33 at some point between the junctions with the pipe 31 and the header 20 to prevent any steam pressure from entering the header.

Each of the valves hereinbefore referred to, namely, the valves 21, 28 and 30 are provided with and are moved to an open position by means of a diaphragm motor 34 of a nature whereby the valves will be moved to an open position by admitting air pressure to the motor, the valves being of a self-closing type so that upon relieving the diaphragms from air pressure the valves operated thereby will close.

As shown in Figs. 3 and 12, the control mechanism within the control box 7 consists of a disk program device or cycle controller 35 that is loosely mounted for rotation on a shaft 36 which is held against rotation but is adapted to slide in a bracket 37 that is normally secured to a lug 38 depending from the upper wall of the box 7. The free end of the shaft 36 as well as the hub of the disk 35 extends forwardly through a perforation 39 provided in the hinged door 40 of the box and the outer end of the shaft 36 is threaded to receive a knurled nut 41 which holds the disk 35 in proper position against a shoulder 42 on the shaft 36. With this construction, the disk 35 is easily removable from the shaft 36, such removal being accomplished by removing the nut 41 and then opening the door 40 whereupon the disk may be removed from the shaft. As will be seen in Figs. 1 and 2, the door 40 is provided with a latch handle 43 adjacent its lower edge to hold the door in closed position and, to retain the door in open position, a flat bar 44 is loosely pivoted to the door and provided with a notch 45 on its lower end that drops by gravity over a pin 46 secured to the wall of the control box 7 when the door is opened.

The disk 35 has a plurality of small cam-like projections 47 on the side thereof that is furthest removed from the door 40, the cam-like projections being arranged in a number of different substantially circular paths or rows and when the disk is slowly rotated by mechanism hereinafter described each row of cams cooperates with and actuates valve mechanism that will cause fluid pressure to pass to a particular valve operating diaphragm or diaphragm motor. Two of these circular rows of cams actuate levers to open and close electric switches for controlling the various motors or power units; one row of cams actuates a lever to swing a segment 107 through different angles and thus move the multiple valve 100 to different positions to determine the height of water level in the tub 1, and another row of cams actuates a lever which, in turn, in conjunction with a thermostatically operated diaphragm, controls the temperature of the water in the tub by automatically operating a cold water valve, a hot water valve and a steam valve through the medium of small auxiliary air valves. All of this mechanism will be subsequently described in detail.

Each disk 35 is so constructed as to take care of only one particular formula and the disks are interchanged for different formulas. The length of time consumed by each formula is determined by one complete revolution of the disk 35. For example, for a seventy minute formula the disk 35 would make one revolution in seventy minutes.

To determine the point in a formula in which the machine is operating at any desired time, the disk 35 is provided with a circular row of graduation marks as shown in Fig. 1 that read from zero to the number of minutes required for the operation of a complete formula and the door 40 is provided with an opening 48 through which the indicating marks are visible and the device is so constructed that the formula may be repeated from a point at, before or after the position in which the apparatus is stopped. That is, if for any reason it should be desired to start a formula over again from the beginning or point indicated by the zero mark, provision is made whereby this may be done by shifting the disk 35 and shaft 36 laterally and towards the door 40 a sufficient distance to disengage the disk's peripheral teeth 49 from the teeth of a small driving gear 50 at which time the disk 35 is free to be turned to any desired position by grasping the protruding end of its hub. After the disk is turned to the desired position to bring the correct graduation on the disk into the proper position, the disk is slid or pushed backwardly with the shaft 36 until its teeth again engage or mesh with the teeth of the gear 50.

As a means for locking the disk in this position, a pivoted gravity latch 51 is provided that drops in front of an upwardly extending lug 52 on the right hand end of the shaft in its extreme right hand position by providing a wedge or spacer between the lug 52 and the bracket 37, see Fig. 12. To lift the latch 51 and disengage it from the lug 52, a push button 53 is disposed at the opposite end of the shaft 36 and is mounted on the end of a shaft 54 which extends through a central bore in the shaft 36 and has a cone shaped head 55 on the end thereof which engages an extension of the free end of the latch 51. The rod 54 is yieldingly held in its extreme outer position by a suitable spring 56 and when moved inwardly raises the latch 51 through the medium of the cone-shaped head 55.

Means for slowly rotating the disk 35 consists of a motor 57 arranged to drive the disk through suitable speed reducing gearing generally indicated at 58, Fig. 3, and including the small gear 50. This small gear 50 is made removable from the shaft on which it is mounted and to which it is keyed by means of a knurled nut 59 threaded on the reduced end of the shaft and accessible when the door 40 is in open position. Removal of the gear 50 is necessary in order that the gear may be changed each time a formula disk is changed for a formula disk of different time run, although the same gear may be used for different formula disks which run the same number of minutes.

In this construction, seven of the valve actuating mechanisms cooperating with the disk 35 are identical in construction. One of these valve mechanisms is shown in Fig. 11 and embodies a tubular plunger 60 having a beveled extension 61 at its forwardmost end which is engaged by one set of the cam lugs 47 on the disk 35. The plunger 60 is mounted to freely slide in an arm 62 which is rectangular in cross section and is integral with the bracket 37 secured to a wall of the box 7. There are, in reality, two arms 62, one on the left hand side of the shaft 36 having three plungers 60 and one on the right hand side of the shaft having four plungers, making seven plungers in all.

A major portion of the outer cylindrical wall of the plunger 60 is reduced in diameter to form an annular shoulder 63, the hole or opening into which the plunger loosely fits has a reduced portion forming an annular shoulder 64, and a small coiled expanding spring 65 is interposed between the two annular shoulders to yieldingly hold the plunger 60 in its forwardmost position wherein it will cooperate with a cam lug 47. A plug 66 is adapted to loosely slide in the interior of the plunger 60 and is limited in its sliding movement by a threaded pin 67 that is threaded into the plug 66 and extends through a slot 68 in the plunger 60. The plug 66 has a radial extension 69 on its rearwardmost end which serves as a stop to the forward movement of the plug 66 by acting against the rear wall of the arm 62, and the free end of the pin 67 as passing through the slot 68 extends through a slot 70 provided in the arm 62 to prevent the plunger 60 and the plug 66 from turning on their longitudinal axes.

The plug 66 is provided in its forward end within the plunger 60 with an opening 71 between the bottom of which and the inner end wall of the plunger 60 is interposed a coiled expanding spring 72 which yieldingly presses the plunger 60 forwardly and the plug 66 rearwardly so that the pin 67 is against the rearward end of the slot 68. Actually, in this normal position, the spring 65 presses the extension 69 against the rearward wall of the arm 62 where the extension passes under the free hooked end of a gravity latch 73 to be locked in such position. This gravity latch 73 is loosely pivoted on a pin 74 that passes through suitable ears 75 on the upper side of the arm 62 and the free end of the latch carries a screw bolt 76 whose one free end extends downwardly through an opening in the arm 62 and into the path of the plunger 60 whose end 77 is spaced a short distance from the end of the screw 76 so as to provide a lost motion between the sliding plunger 60 and the screw.

The parts are so arranged that when the plunger 60 is depressed by contact with a cam lug 47, the plunger 60 will be moved rearwardly to almost its limit before the latch 73 will be lifted through contact of the end 77 of the plunger with the free end of the screw bolt 76 to release the extension 69 of the plug 66. Then, as soon as the extension 69 is released, the plug 66 will be forced rearwardly with a snap action by reason of the power stored up in the spring 72 in which movement it will contact with and depress a valve stem 78 to open a valve 79 and close a valve 80 which valves are provided in a housing 81 that is secured adjacent to the arm 62. However, as soon as the cam lug 47 on the disk 35 has passed under the beveled end 61 on the plunger 60, the plunger and the plug 66 will again assume their normal forward positions just described under the action of the spring 65 and will thereby be in a position to be operated with the next succeeding cam lug 47 in the same circular row.

In actual construction, there are two housings 81, one being on the left hand side of the shaft 36 and containing three sets of valves 79 and 80 and the other being on the right hand side of the shaft 36 and containing four sets of valves 79 and 80. A spring 82 is provided to normally yieldingly hold the valves 79 and the valves 80 in closed and open position respectively and each housing 81 is provided with a compressed air inlet port 83, a compressed air outlet port 84, and an exhaust port 85. The valve 79 controls the flow of air from the intake 83 to the outlet 84 and the valve 80 controls the exhaust of air from the duct 84 to the atmosphere through the exhaust port 85. With this construction, each time the plunger 60 is depressed by a cam lug 47 in the manner hereinbefore described, the valve 80 will be closed and the valve 79 opened to admit compressed air into the duct 84 and, in normal position, compressed air will be permitted to pass from the duct 84, past the valve 80 and through the port 85 to the atmosphere.

As shown in Figs. 1, 2 and 3, a small tube 86 connects each duct 84 with its particular diaphragm motor 34 or with the cylinder 19 and as hereinbefore stated there are seven valve mechanisms actuated by the cam lugs 47 and six diaphragm motors 34 so that but one of the tubes 86 connects one of the ducts 84 with the cylinder 10 controlling the dump valve 3. Thus, the different cam lugs 47 in the different rows on the disk 35 are properly spaced apart to open and close the usual valves 3, 21, 21, 21, 21, 28 and 30 at the proper times to carry out the particular formulas represented by the particular disk disposed in the machine. However, there is one set of cam lugs 47 provided to close an electric switch 87 completing the circuit to the motor 6 and another set of cam lugs to close a switch 88 to complete an electric circuit to the motor 57 and the cam lugs are so arranged with respect to time and position that the motor 6 will cease operation before the motor 57 is brought to a stop so that all operations of the formula are completed before the motor 57 and disk 35 cease to operate.

One circular row of cam lugs 47 on the disc 35 controls the opening of the hot and cold water valves by controlling the flow of air pressure to water valve operating diaphragm motors 34. However, the only immediate function of these particular cam lugs 47 is to open a master control valve and an otherwise closed air line to the diaphragm motors. Other air pressure flow control means are provided in the air pressure line, one to control the flow of air pressure and operation of the hot and cold water valves 15 and 16 in accordance with the level of water in the tub, and the other to thermostatically control the flow of air pressure to operate the hot or the cold water valve respectively in accordance with the temperature of water in the tub. The hot and cold water valves 15 and 16 are preferably of the self-closing type and, as hereinafter apparent, the thermostatic control means is so arranged that both valves will never be in open position simultaneously.

The water level control means consists of a plurality of air pressure flow control valves 96 in advance of the master control valve, each having connection with an air pressure supply line 98 and a delivery line 99 which leads to the master control valve 100, hereinafter described, operated by cam lugs 47 on the disc 35. Such valves 96 are normally open and are adjustably mounted in a circular row about a shaft 94 (see Figs. 2 and 6) with their protruding valve stems adjacent one face of a disc gear 93 and spaced therefrom to be engaged and moved to closed position by a cam 97 on the disc gear when the gear is rotated. Thus, air pressure from the supply lines 98 is normally supplied to the valve 100 through the lines 99, air pressure through only one of such lines 99 passing to the water valve operating diaphragm motors 34 at any one time as controlled by the valve 100, and such flow to the valve 100 is only cut off by rotation of the disc gear 93.

Five valves 96 are provided and each valve is adjustably secured on a circular member 102 by means of a clamping screw 101, the member 102 being rigidly mounted on the shaft 94, whereby the valves 96 may each be adjusted to any desired position in a circular path about the shaft. One face of the disc gear 93 is graduated (see Fig. 2) and the five valves 96 may be set coincident with the graduation representing the water level in the tub at which such valve will be closed, for example, two, six, ten, fourteen and twenty inches respectively, which should take care of all the different water levels necessary during a washing formula. The cam 97 is preferably located coincident with the zero graduation on the disc.

In the operation of this water level control means, a float 89, disposed in a float chamber 90 located conveniently to the tub 1 and having its bottom connected to the tub by a pipe 91 so that the water level in the tub and chamber will assume the same level, rises and turns the disc gear 93 through a rack bar 92 meshing with the disc gear which is loosely mounted on the shaft 94 which is secured to a bracket 95 on the top of the float chamber 90. The parts are so disposed that the disc gear 93 will be rotated in a clockwise direction Fig. 2 when the float 89 moves upwardly and in the opposite direction when the float moves downwardly. Likewise, the valves are so coordinated with the position of the cam 97 that when the water in the tub 1 is say two inches deep, the cam 97 on the disc gear will have reached the position originally occupied by the corresponding disc graduation, say the figure 2, so that, as will appear, the water supply will be shut off at that point, the cam having contacted with the stem of the valve 96 set at that position.

The master control valve 100, operable by cams 47 on the disc 35, is of a multiple type having in this instance five "on" positions, corresponding to the number of air pressure delivery pipes 99 leading thereto from the five valves 96 just described. In each one of its "on" positions, which it assumes under the influence of cams 47 of different heights, it permits air pressure to flow from a selected one of the valves 96 past the valve 100 and to a thermostatic water supply control means hereinafter described.

Specifically, the valve 100 consists of a rotatable plug 103 having a central bore 104 communicating with a radial bore 105 (see Figs. 4 and 5) which is arranged to register with any selected one of five inlets from the pipes 99 to the valve casing, the central bore 104 also communicating with a radial bore 113 which, in turn, has communication with a circular groove 114 and the discharge pipe 115 of the valve. To rotate the plug 103, a small gear 106 is mounted on the protruding stem thereof, the gear 106 being in constant mesh with a segmental gear 107 pivotally mounted as at 108 on the housing of the valve. This segmental gear 107 is normally yieldingly held against a stop 109 by a spring 110 and the plug 103 held in its "off" position wherein the radial bore 105 does not register with any of the five inlet ports to which the pipes 99 lead. The part 111 of the segmental gear-carrying arm has a roller 112 on its free end arranged to be engaged and moved by the valve operating cam lugs 47 on the disc 35 so that the segmental gear 107 and plug 103 are moved to open the valve 100 by registering the radial bore 105 with one of the valve inlet ports. For example, when the lowest one of the cam lugs 47 engages the roller 112, the radial bore 105 will be in registry with the first intake port of the valve 100 and the air pressure line from the first of the five valves 96 will be opened through the master control valve. Following in order, the next high cam lug 47 will open a passage from the second valve 96 through the second intake port of the master control valve, and so on around the cycle with the position of the plug 103 selecting the one of the valves 96 in the operating air pressure line, and thus the depth of water in the tub 1. With this arrangement, the valves 96 control the time that the water inlet valves remain open, regardless of the master control valve 100 remaining in open position, after having once been moved thereto to select the one of the valves 96 which is closed in accordance with a desired water depth.

Flow of air pressure to the diaphragm motors 34 through the pipe 115 for opening the hot and cold water valves 15 and 16 is controlled subsequently of the master control valve 100 in the complete air pressure line by thermostatically operated valves 116 and 117, one controlling the flow of air to each motor 34 through pipes 118 and 119 respectively.

The thermostatic control mechanism comprises, besides the thermostatically controlled valves 116 and 117, a third thermostatically controlled valve 120 which controls the passage of compressed air through a pipe 120' to operate the steam valve 32 that controls the flow of steam through the pipe 31 to heat or boil the water in the tub 1. A weighted lever 121 that is pivotally mounted as at 122 has its free extending end disposed over a thermostatically operating diaphragm 123 and over the protruding stems of the hot water controlling valve 117 and the steam controlling valve 120 as shown in Fig. 7. Likewise, the lever 121 extends below the protruding valve stem of the cold water controlling valve 116 an arm 121' being arranged on the lever to contact the valve stem as shown. Each of the valves 116, 117 and 120 is preferably of the construction shown in Fig. 9 wherein the valve is opened to admit compressed air to the associated diaphragm motor when the valve stem 130 is pushed in. Thus, if the free end of the lever 121 is permitted to lower by gravity both the valves 117 and 120 will be opened to permit hot water and steam to enter the tub, the valve 116 and the cold water valve closing, and when the free end of the lever is lifted the valve 116 is opened to permit cold water to enter the tub 1, the valves 117 and 120 being closed by suitable springs and the hot water and steam valves resultantly closing.

The reason for providing the steam valve 120 is to heat the water already in the tub when as much water as is required for a particular step of the formula is already present, on some occasions steam only being admitted to the tub. This takes place when the air pressure for opening of the hot water valve has been shut off through one of the valves 96 by action of the float 89. However, the air supply to the valve 120 is never shut off, it coming from a constant source of supply through pipe 83 and, when the valve 130 is moved inwardly, flowing through pipes 83' and 83" to pipe 120'. An adjusting screw 124 is provided on the lever 121 so that one end thereof contacts with the thermostatically operated diaphragm 123 which is of the usual type having a small tube 125 connecting it with a bulb immersed in the water in the tub whereby changing temperature of the water in the tub will cause the free end of the lever 121 to be raised or lowered by the expanding or contracting of the thermostatically operating diaphragm 123.

Each wash run of a formula requires a number of different temperatures of the water and means have been provided whereby the several different temperatures are automatically set by means of radially extending cams 126 as shown in Fig. 7 that are fixed on the slowly rotating disk 35. The pivot 122 of the weighted lever 121 is mounted on a lever 127 a short distance rearwardly of the pivotal point 128 of the lever 127 which is located on a bracket on the frame 129 that carries all of the valves 116, 118 and 120 and the thermostatic diaphragm 123. The frame 129 is rigidly mounted on the control box 7 in such position that the free end of the lever 127 will rest by gravity in the path of the radial cams 126 on the disk 35. Thus, when the free end of lever 127 is lifted by a cam 126, the pivotal point 122 of the lever 121 will be lifted to raise the end of the set screw 124 further above the thermostatic diaphragm 123 resulting in a higher temperature and further expansion of the diaphragm being required of the tub water before the arm 121 will be raised to permit valves 117 and 120 to close. Thus, the registration set for the temperature for the water in the tub is varied.

In the operation of the thermostatic control means, the set screw 124 is adjusted so that the lowest cam 126 on the disk 35 will cause the hot and cold water to be discharged into the tub 1 in such proportions that the water in the tub will register in predetermined temperature, for instance, 100°. Then, when a higher cam part 126 acts on the free end of the lever 127 to raise the lever slightly, the valves will be actuated to feed a mixture of hot and cold water into the tub so as to have the temperature of the water register higher than previously or higher than 100°. In other words, the higher the cam 126 that acts on the free end of the lever 127 is, the greater the expansion of the diaphragm must be to open the cold water valve, and the higher will be the temperature of the water in the tub. It will be understood that the heights of the cam parts 126 are governed by the requirements of the desired formula.

With the construction above described, we have provided an automatic formula control for washing machines wherein the steps of the formula are controlled and take place automatically whereby the operator is relieved of all responsibility except that of loading and unloading the machine, the starting and stopping of which is automatically taken care of by electric switch mechanisms operated by the same means that controls the steps of the formula. An audible or a visible signalling means may be so attached to the control mechanism or to the operating parts that the operator will be advised at the instant that a run is completed. Various advantageous features embodied in our invention include, aside from providing for automatic operation for the steps of the formula, the provision of means for automatic controlling the height of water in the tub which varies with practically every step of the formula, and thermostatic control means for controlling the temperature of the water in the tub regardless of its amount or height.

Thus operation through a typical elementary cycle may be summarized as follows, assuming supplies of steam, hot and cold water, compressed air, detergents, etc., connected with their several systems as above described; and the proper cycle controller disk selected and suitably mounted, and its driving motor 57 started into operation.

The tub is first to be filled with warm water to a low level. One of the cams 47 acting on corresponding apparatus such as that shown in Fig. 11, in the air supply line, energizes the air line intake 83 of the tub water temperature control apparatus appearing in Figs. 7 to 9 inclusive. This apparatus selectively energizes the air control lines 118 and 119 for the diaphragm motors 34 of the hot and cold water inlet valves 15 and 16 so that water commences to flow into the tub, alternately hot and cold, with steam if necessary, in such proportions that the tub water has the proper temperature, these proportions being determined by the cam 126 acting on the lever 127.

Meanwhile, another of the cams 47 operating on the actuating roller 112 for the level selector valve 103, of the apparatus appearing in Figs. 4 to 6, indexes the valve 103 to one of the air lines 99 to predetermine the level to which the tub is to be filled. As the level rises in the tub, carrying with it the float 89, the cam 97 is moved until it closes that air valve 96 determined by the setting of the level selector valve 103. Closing of the valve 96 cuts off air from the corresponding line 99 and thereby de-energizes the air lines for both hot and cold water valves 15 and 16, closing whichever happens to be open at the time, so that flow to the tub ceases, the tub having now received the proper amount of water at the proper temperature. Shortly thereafter the first mentioned cam 47 permits closing of the air line intake 83.

A suitable detergent fluid from one of the tanks 22 is next—or during the filling of the tub— to be added to the tub water. This is accomplished by another cam 47 on the cycle controller disk, energizing, through apparatus such as shown in Fig. 11, the air line of the diaphragm motor 34 of the corresponding detergent supply valve 21. The detergent thus fed into the pipe 19 is injected into the tub water by the injectors 17 under control of the injector valve 32 which is opened, by means including a cam 47 on the cycle controller disk, energizing the corresponding diaphragm motor 34 by its air line 86.

Then, or meanwhile, the washing cylinder is started in operation by closing of the switch 87 for its driving motor 6, the switch mechanism being actuated by the cam 126.

To dump the used washing water from the tub after a suitable time interval, the dump valve 3 is opened by operation of its actuating cylinder 10 through energization of the corresponding one of the air lines 86, as usual by one of the cams 47.

The tub is next to be filled with cold water for rinsing of its contents. The sequence of steps to accomplish this filling will be generally as in the original filling just described, except that another cam 126 now sets the lever 127 to deliver cold water only to the tub, and the level selector valve 103 will now be set by another cam 47 to fill the tub to a higher level than before.

After a further running time interval, with the rinse water in the tub, the dump valve will be opened as before to re-empty the tub.

Coincidently, the driving motor switch 87 will be opened by the cam 126 and the washing cylinder will stop, its cycle of operations having been completed.

The cycle controller disk has now completed its performance, and having been rotated by its driving motor 360°, its switch 88 is now reopened and all parts of the machine are at a standstill.

What we claim is:

1. A washing machine having a container wherein different liquid levels are to be established at different stages in a cycle of washing operations, a liquid supply valve for said container, a cycle controller, control means for said valve including means connecting said controller to said valve to cause opening of the valve responsive to the controller, means for closing said valve including means responsive to liquid level in said container, means providing actuating connection from said level responsive means to said valve and including level selector means connected with said level responsive means to predetermine the level at which said latter is effective upon said valve, and means connecting said level selector means to said cycle controller for determination by the cycle controller of the setting of the level selector.

2. A washing machine having a container wherein different liquid contents are to be had at different stages in a cycle of washing operations, including hot and cold water supply valves, a cycle controller, means connecting said cycle controller with said valves and arranged to permit opening of the valves only during periods determined by the cycle controller, said connecting means being indiscriminate as between said valves, temperature responsive means having connection with said container to be controlled by the temperature of the container contents, and means connecting said valves to said temperature responsive means and providing for selective opening of said valves, when opening is permitted by said cycle controller, dependent upon said container temperature.

3. A washing machine having a container wherein different liquid contents are to be had at different stages in a cycle of washing operations, including hot and cold water supply valves, a cycle controller, means connecting said cycle controller with said valves and arranged to permit opening of the valves responsive to the cycle controller, temperature responsive means having connection with said container to be responsive to the temperature of the container contents, means connecting said valves to said temperature responsive means and providing for selective opening of said valves dependent upon said container temperature, and means interconnecting said cycle controller and said temperature responsive means to determine the temperature to be attained by said selective valve opening.

4. A washing machine having a container wherein different liquid contents are to be had at different stages in a cycle of operations, including hot and cold water supply valves, a cycle controller, means interconnecting said controller and said valves and arranged to permit opening of the valves only during periods determined by the cycle controller, said connecting means being indiscriminate as between said valves, temperature responsive means having connection with said container to be controlled by the temperature of the container contents, means connecting said valves with said temperature responsive means and providing for selective opening of the valves, when opening is permitted by said cycle controller, dependent upon said container temperature, means responsive to liquid level in said container, means connecting said level responsive means with said valves to close the latter independent of said temperature control means and including level selector means connected with said level responsive means to predetermine the level at which the latter is effective upon said valves, and means connecting said level selector means to said cycle controller for determination by the cycle controller of the setting of the level selector.

5. A washing machine having a container wherein different liquid contents are to be had at different stages in a cycle of washing operations, with hot and cold water supply connections and a valve in each said connection, a cycle controller, means connecting said cycle controller with said valves and arranged to permit opening of the valves only during periods determined by said cycle controller, said connecting means being indiscriminate as between the valves, temperature responsive means having connection with said container to be controlled by the temperature of the container contents, means connecting said valves to said temperature responsive means and providing for selective opening of said valves, when opening is permitted by said cycle controller for automatic control of the temperature of water supplied to said container, dependent upon said container temperature, means responsive to liquid level in said container, means connecting said level responsive means with said valves to close the latter independent of said temperature control means, and including level selector means connected with said level responsive means to predetermine the level at which the latter is effective upon said valves, and means connecting said level selector means with said cycle controller, to make the former responsive to the latter.

FRED BALZER.
GILBERT B. KNAPMEYER.